United States Patent
Uetabira

(10) Patent No.: US 9,843,571 B2
(45) Date of Patent: *Dec. 12, 2017

(54) IDENTITY CONFIRMATION METHOD AND IDENTITY CONFIRMATION SYSTEM

(71) Applicant: INTERMAN Corporation, Kagoshima (JP)

(72) Inventor: Shigeki Uetabira, Kagoshima (JP)

(73) Assignee: INTERMAN Corporation, Kagoshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/393,889

(22) Filed: Dec. 29, 2016

(65) Prior Publication Data

US 2017/0149758 A1  May 25, 2017

Related U.S. Application Data

(63) Continuation of application No. 14/166,380, filed on Jan. 28, 2014.

(30) Foreign Application Priority Data

Nov. 20, 2013   (JP) ................................ 2013-239485

(51) Int. Cl.
*H04L 29/06* (2006.01)

(52) U.S. Cl.
CPC .................................. *H04L 63/08* (2013.01)

(58) Field of Classification Search
USPC ........................................................ 726/3, 7
See application file for complete search history.

(56) References Cited

U.S. PATENT DOCUMENTS 6,549,192 B1   4/2003 Fujita
6,954,735 B1  10/2005 Djupsjöbacka et al.
(Continued)

FOREIGN PATENT DOCUMENTS

JP   2004-157675 A   6/2004
JP   2008-158683 A   7/2008
(Continued)

OTHER PUBLICATIONS

Rejection Notice dated Oct. 3, 2017 of corresponding Japanese patent application No. 2013-239485; 6 pgs.

*Primary Examiner* — Jason Lee
(74) *Attorney, Agent, or Firm* — Maier & Maier, PLLC

(57) ABSTRACT

An identity confirmation method and an identity confirmation system which do not require users to remember passwords, and which automatically update credentials for use in identity confirmation, without need for manipulation by users. This identity confirmation method and system receives current location information from a mobile communication device of a user in order to accumulate, as location information history, current location information of a user. As part of a process of confirming a user's identity, the identity confirmation system generates a question relating to this location information history. When the user returns an answer to the question, the identity confirmation system compares and matches the answer with the location information history and confirms the identity of the user if the answer coincides with the location information history.

4 Claims, 17 Drawing Sheets

(56) References Cited

U.S. PATENT DOCUMENTS

| | | |
|---|---|---|
| 2004/0092269 A1 | 5/2004 | Kivinen |
| 2004/0254718 A1 | 12/2004 | Cheon |
| 2004/0260466 A1 | 12/2004 | Ichihara et al. |
| 2008/0120021 A1* | 5/2008 | Kaneda ............... G01C 21/343 701/533 |
| 2008/0146193 A1 | 6/2008 | Bentley et al. |
| 2008/0270938 A1 | 10/2008 | Carlson |
| 2008/0307515 A1 | 12/2008 | Drokov et al. |
| 2009/0063460 A1 | 3/2009 | Selberg |
| 2011/0219328 A1* | 9/2011 | Ilvessalmi ............ G06Q 10/109 715/780 |
| 2012/0289186 A1 | 11/2012 | Ayalur |
| 2013/0036360 A1 | 2/2013 | Hallsten |
| 2013/0116967 A1 | 5/2013 | Akcasu et al. |
| 2013/0133055 A1* | 5/2013 | Ali ..................... H04L 63/0861 726/7 |
| 2013/0167208 A1 | 6/2013 | Shi |
| 2014/0215563 A1 | 7/2014 | Kang |

FOREIGN PATENT DOCUMENTS

| | | |
|---|---|---|
| JP | 2009-288823 A | 12/2009 |
| JP | 2010-277540 A | 12/2010 |
| JP | 2011-070341 A | 4/2011 |
| JP | 2011-133975 A | 7/2011 |
| JP | 2012-203781 A | 10/2012 |

\* cited by examiner

| No. | Date | Time | Latitude | Longitude | Cell-ID | Sensitivity |
|---|---|---|---|---|---|---|
| ⋮ | ⋮ | ⋮ | ⋮ | ⋮ | ⋮ | ⋮ |
| 00014238 | 20110828 | 113229 | 35.415915 | 139.658804 | 10922 | 78 |
| 00014239 | 20110828 | 153437 | 35.413829 | 139.653372 | 10932 | 81 |
| ⋮ | ⋮ | ⋮ | ⋮ | ⋮ | ⋮ | ⋮ |

ID: 415bfa41

| No. | Date | Time | Latitude | Longitude | Cell-ID | Sensitivity |
|---|---|---|---|---|---|---|
| ⋮ | ⋮ | ⋮ | ⋮ | ⋮ | ⋮ | ⋮ |
| 00012247 | 20110828 | 114832 | 35.415915 | 139.658804 | 10919 | 70 |
| 00012248 | 20110828 | 153056 | 35.413312 | 139.660393 | 10922 | 70 |
| ⋮ | ⋮ | ⋮ | ⋮ | ⋮ | ⋮ | ⋮ |

| ID | Date | Time | Latitude | Longitude | Cell-ID | Sensitivity |
|---|---|---|---|---|---|---|
| ⋮ | ⋮ | ⋮ | ⋮ | ⋮ | ⋮ | ⋮ |
| 415bfa41 | 20111003 | 181122 | 35.668781 | 139.549802 | 10922 | 82 |
| 0bfa4911 | 20111003 | 181131 | 35.681370 | 139.748938 | 10916 | 81 |
| ⋮ | ⋮ | ⋮ | ⋮ | ⋮ | ⋮ | ⋮ |

Fig. 5

Records of Nearby Users Correlated with You

| ID | Place (or thereabouts) | Date | Time | Staying |
|---|---|---|---|---|
| 415bfa41 | Honmoku Local Park in Yokohama | 2011/08/28 (2011/08/28) | 11:48 (11:32) | 4:25 (4:32) |
| 07f53811 | Nissan Stadium | 2011/09/03 (2011/10/30) | 15:48 (15:32) | 2:18 (2:13) |
| ⋮ | ⋮ | ⋮ | ⋮ | ⋮ |

[ User Search ]

Fig. 6

Records of User (415bfa41) Correlated with You

[ Send Message ]

| Place (or thereabouts) | Date | Time | Staying |
|---|---|---|---|
| Honmoku Local Park in Yokohama | 2011/08/28 (2011/08/28) | 11:48 (11:32) | 4:25 (4:32) |
| Yokohama WORLD PORTERS | 2011/08/12 (2011/08/12) | 11:37 (11:32) | 2:38 (2:32) |
| ⋮ | ⋮ | ⋮ | ⋮ |

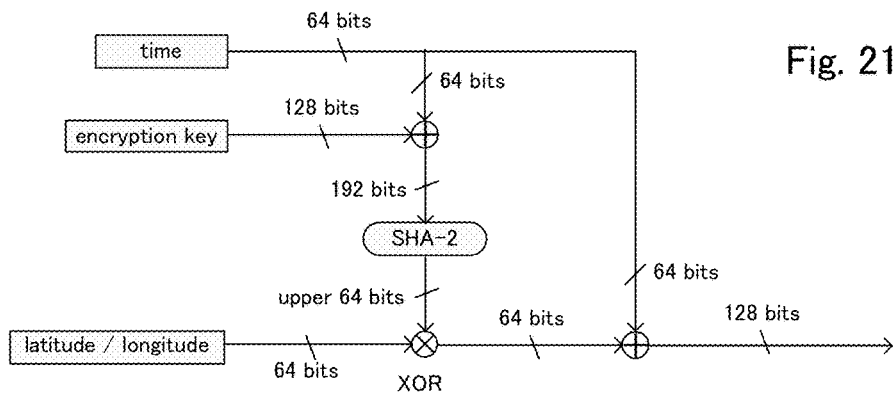
Fig. 21
Fig. 22
| 0 → | 0x5274973a | |
| --- | --- | --- |
| | ⋮ | ⋮ |
| | 035.681370 | 139.658804 |
| | 035.707803 | 139.680468 |
| A → | 035.682391 | 139.660322 |
| A+1 → | 035.583804 | 139.566928 |
| | 035.684032 | 139.662928 |
| A+3 → | 035.804589 | 139.967989 |
| | 035.685932 | 139.664923 |
| A+5 → | 035.137068 | 139.869309 |
| | 035.689239 | 139.666771 |
| A+7 → | 035.937390 | 139.629863 |
| | ⋮ | ⋮ |
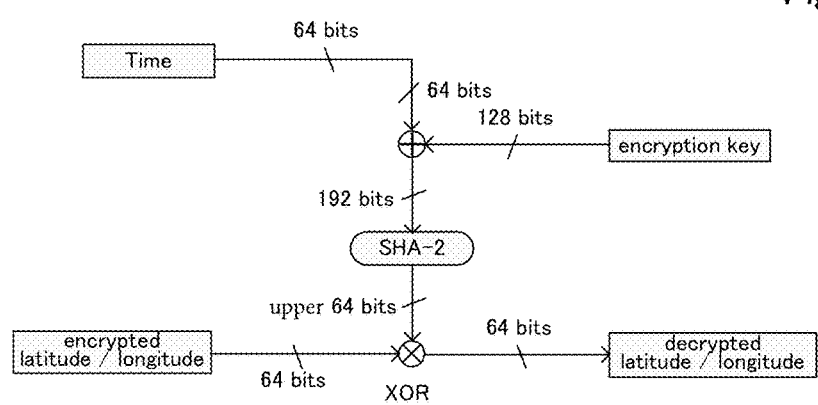
Fig. 23

Fig. 27

USER SEARCH

Place: (required) | Honmoku Local Park in Yokohama

Date: 2011/08/28   Time: 12:00   Staying Period: 2:00

Search

Fig. 28

USER SEARCH RESULTS

| ID | Place (or thereabouts) | Date | Time | Staying |
|---|---|---|---|---|
| 415bfa41 | Honmoku Local Park in Yokohama | 2011/08/28 | 11:48 | 4:25 |
| 318f5107 | Honmoku Local Park in Yokohama | 2011/08/28 | 11:55 | 3:18 |
| ⋮ | ⋮ | ⋮ | ⋮ | ⋮ |

Fig. 32

TIME/PLACE BBS  *Search*

TITLE: *2011/08/28:Honmoku Local Park in Yokohama*

( POST )

1 :(anonymous) 2013/01/11(Fri) 13:32
   Unfortunately, I could not visit Honmoku to enjoy the jazz festival (2011/08/28). Could you kindly let me know what time the festival actually ended ?

2 :(anonymous) 2013/01/11(Fri) 13:44
   As far as I remember, the festival ends at around 4 p.m.

Fig. 33

*Post a Reply*

Date/Time:  2011/08/28

Place:  Honmoku Local Park in Yokohama

Name:

Message:  As far as I remember, the festival ends at around 4 p.m.

( OK )   ( CANCEL )

Fig. 34

*DATA SEARCH*

Place: (required)  Honmoku Local Park in Yokohama

Date:  2011/08/28

( Search )

IDENTITY CONFIRMATION METHOD AND IDENTITY CONFIRMATION SYSTEM

CLAIM OF PRIORITY

This application is a continuation of U.S. patent application Ser. No. 14/166,380, filed on Jan. 28, 2014, entitled "IDENTITY CONFIRMATION METHOD AND IDENTITY CONFIRMATION SYSTEM," the entire contents of which are hereby incorporated by reference.

1. Field of the Invention

The present invention relates to an identity confirmation method and an identity confirmation system for identifying a user in a secure and easy manner.

2. Discussion of the Prior Art

In recent years, smartphones, cellular phones, PHS (Personal Handyphone System) and the like mobile terminals have continued to spread into a broad range of applications. Besides basic verbal communication functionality, the data communication capabilities of these terminals have been enhanced to provide users with a variety of information services through the Internet. Particularly, a variety of service making use of current location information provided by GPS or the like (for example, as described in Japanese Patent Published Application No. 2011-070341).

Also, when logging in, a user has to input an ID and a password for confirming user identity to use a service. When using a plurality of services, an ID and a password have to be determined for each service, it becomes a burden on the user to keep them in mind. In this situation, an authentication provider makes it possible to use a single sign-on protocol such as OAuth, OpenID as described in Japanese Patent Published Application No. 2012-203781.

However, even under such a single sign-on environment, it is still a substantial burden on a user to manage an ID and a password. First of all, an appropriate password must be selected. A trivial password can be easily cracked. However, it is hard to remember a complicated password. It is particularly troublesome for a user to select an appropriate password.

On the other hand, the user must keep the password secret. It is thereby recommended to periodically change a password. If a password is periodically changed, it is a further burden on a user to select a password again as described above. Accordingly, many users are negligent in periodically changing their passwords.

It is therefore an object of the present invention to provide an identity confirmation method and an identity confirmation system which do not require users to remember passwords.

It is another object of the present invention to provide an identity confirmation method and an identity confirmation system which automatically update credentials for use in identity confirmation, without need for the manipulation by users.

SUMMARY OF THE INVENTION

To achieve at least one of the abovementioned objects, an identity confirmation method comprises: a step of receiving current location information from a mobile communication device of a user; a step of storing and accumulating, as a location information history, the current location information of the mobile communication device in association with the time when the mobile communication device is located in a location indicated by the current location information; a step of receiving an authentication request of said user through a network; a step of referring to the location information history and generating a question relating to the location information history; a step of presenting the question to the user; a step of receiving an answer to the question from the user; a step of comparing and matching the answer with the location information history; and a step of determining the identification of the user if the answer coincides with the location information history.

Preferably, in the invention as described above, the location information history of a user is associated with an identifier which identifies the mobile communication device of the user, said identity confirmation method further comprising: a step of receiving an authentication request of said user together with the identifier from a terminal which is operated by the user; and a step of notifying the determination of the identification of the user to the terminal.

Preferably, in the invention as described above, the terminal is either the mobile communication device or another terminal which is different from the mobile communication device.

Preferably, in the invention as described above, the question is posed by displaying a map and requesting the user to specify, as an answer to the question, a place in the map where the user visited.

Preferably, in the invention as described above, the question is posed by displaying a map and requesting the user to specify, as an answer to the question, a plurality of places in the map where the user visited.

Preferably, in the invention as described above, each of the first and second mobile communication devices detect the current location by the use of a GPS, Wi-Fi triangulation, cell phone tower triangulation or any combination thereof.

Preferably, in the invention as described above, the current location information received from the mobile communication device is encrypted.

BRIEF DESCRIPTION OF THE DRAWINGS

The objects and features of the present invention will become more apparent from consideration of the following detailed description taken in conjunction with the accompanying drawings in which:

FIG. 2 is a view for showing history tables of a history database corresponding to the mobile communication devices of users respectively for use in the user similarity provision method in accordance with the embodiment 1 of the present invention.

FIG. 3 is a schematic diagram for showing a current location table of a history database for use in the user similarity provision method in accordance with the embodiment 1 of the present invention.

FIG. 5 is a view for showing an example of a list which is displayed on one mobile communication device and contains location records of other mobile communication devices correlated with the location history of the one mobile communication.

FIG. 6 is a view for showing an example of a list containing the location records of a particular mobile communication devices selected from among the other mobile communication devices correlated with the location history of the one mobile communication.

FIG. 21 is a view for explaining the method of encrypting the latitude and longitude information according to an embodiment 6 of the present invention.

FIG. 22 is a view for showing the latitude and longitude information stored in a storage according to the embodiment 6 of the present invention.

FIG. 23 is a view for explaining the method of decrypting the latitude and longitude information according to the embodiment 6 of the present invention.

FIG. 27 is a view for showing a search screen for finding information associated with a particular place and a particular time by the use of the user similarity provision method in accordance with an embodiment 9 of the present invention.

FIG. 28 is a view for showing a search result screen of the user similarity provision method in accordance with the embodiment 9 of the present invention.

FIG. 32 is a view for showing a thread screen of the BBS in accordance with the embodiment 9 of the present invention.

FIG. 33 is a view for showing a message edit screen for posting a reply message to the BBS in accordance with the embodiment 9 of the present invention.

FIG. 34 is a view for showing a search screen for finding information through the BBS in accordance with the embodiment 9 of the present invention.

DESCRIPTION OF THE PREFERRED EMBODIMENTS

In what follows, identity confirmation methods in accordance with several embodiments of the present invention will be explained with reference to the accompanying drawings. It is assumed that mobile communication devices for use in the user similarity provision methods are capable of acquiring the current location information and accessing the Internet. More specifically speaking, these mobile communication devices include conventional feature phones, multifunction terminals called smartphones having touch-panel screens, tablet computers, notebook computer and the like. The location information of a mobile communication device can be provided from GPS, Wi-Fi triangulation, cell phone tower triangulation or any combination thereof.

Incidentally, while the location information of each user is accumulated in a server or a mobile communication device of the user in the following embodiments, it is easy to identify the address of the user's home and the location of the working place or school from the location information history. For example, in the location information history, there may appear location records indicating that the user has stayed home every night and location records indicating that the user has stayed in the working place or school for substantial periods in weekdays. On the other hand, in holidays, there are few location records corresponding to the working place or school. Depending upon the case, this may not be preferred from the view point of privacy. Accordingly, it is preferred to exclude these location records having such patterns from the location information history.

Furthermore, the security of the identity confirmation can be improved by excluding the current location information which is repeatedly transmitted. This is because even another person may recall the working place or the school. The current location information which is not repeated is usually known only by the user.

Embodiment 1

Figure 1:
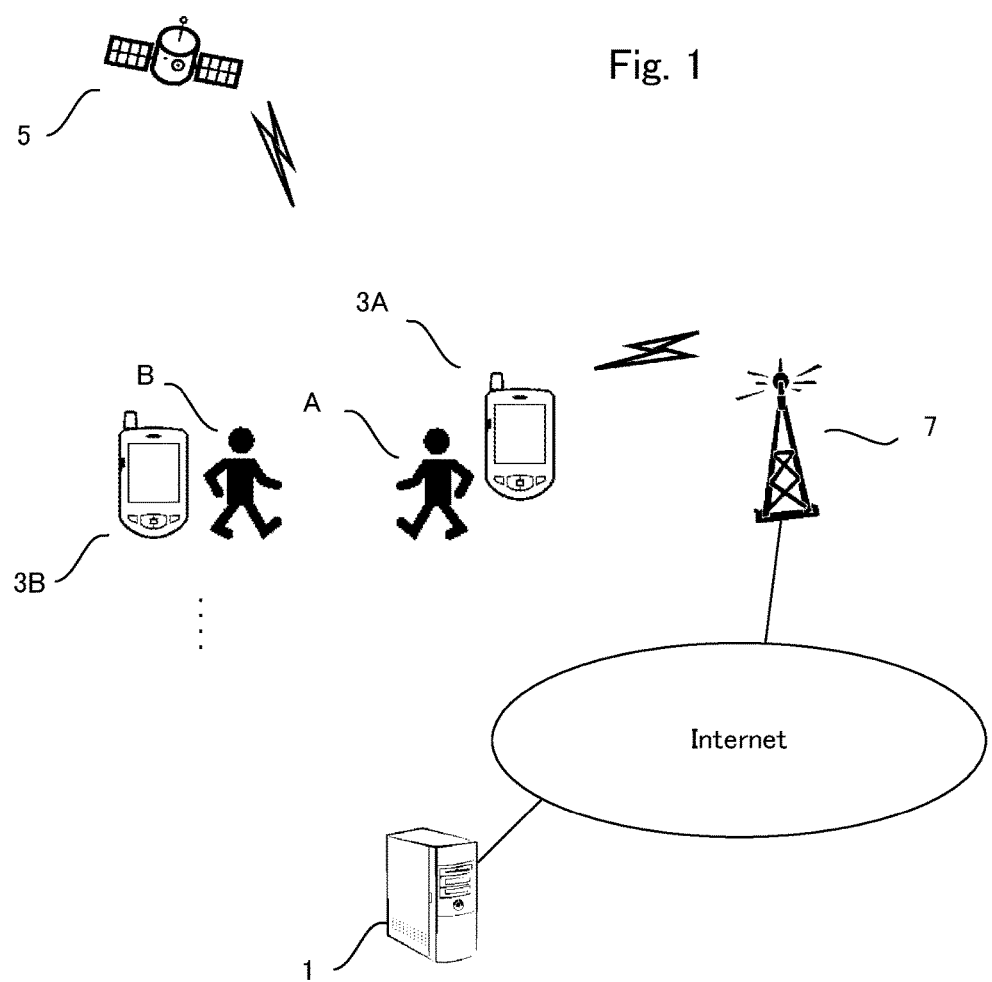
FIG. 1 is a view for explaining a user similarity provision method in accordance with an embodiment 1 of the present invention.

Referring to FIG. 1, an identity confirmation apparatus and an identity confirmation method in accordance with an embodiment 1 will be explained. This identity confirmation apparatus is implemented as an identity confirmation server (authentication provider) which is serves also as a user similarity provision server. The user similarity provision server performs a user similarity provision method which will be explained below. This method is performed by a visited location history matching server 1 which is connected to the Internet. A user who wants to use this user similarity provision method has to download a resident program from a server and install the resident program in a mobile communication device carried by the user.

This resident program acquires the current location information of the mobile communication device and transmits this current location information to the visited location history matching server 1. Needless to say, while only two users, i.e., a user A carrying a mobile communication device 3A and a user B carrying a mobile communication device 3B are illustrated in FIG. 1 as the users of this user similarity provision method, it is assumed that there are a number of other users using this system.

The visited location history matching server 1 manages visited location histories of users with a history database, which includes history tables 2 which are provided for mobile communication devices respectively as illustrated in FIG. 2. Each history table 2 contains location records each of which includes a field holding a date, a field holding a time, a field holding a latitude, a field holding a longitude, a field holding a Cell-ID, and a field holding a receiving sensitivity. In response to a timer event, the resident program creates a location record indicating that the mobile communication device has been located in the current location stored in the latitude and longitude fields on the date and time stored in the date and time fields and communicated with a base station 7 identified by the Cell-ID field with the receiving sensitivity stored in the receiving sensitivity field.

Each history table 2 is associated with a terminal ID which is allocated to each user when downloading the resident program and unique to this each user. The location records contained in each history table 2 are arranged in a time series with serial numbers. That is to say, each history table 2 is uniquely correlated to an individual terminal ID. When transmitting current location information to the visited location history matching server 1, the resident program transmits this terminal ID as well as a Cell-ID and a receiving sensitivity in the form of a location record. In place of the terminal ID allocated by the server, an identification number associated with an individual terminal such as ANDROID_ID may be used for the same purpose. Specifically speaking, the resident program periodically acquires the current location information, i.e., the latitude and longitude of the mobile communication device provided from GPS or the like at intervals of several minutes (for example, every five minutes in this case).

The history database of the visited location history matching server 1 includes a current location table in which are stored the current location information of each mobile communication device identified by the terminal ID as illustrated in FIG. 3. The current location table contains one location record for each mobile communication device, and includes fields corresponding to the fields contained in the history table, except for the serial number field which is replaced with a field for storing the terminal ID of each location record.

When receiving a current location information from a mobile communication device, the visited location history matching server 1 determines whether or not this mobile communication device is registered in the current location table on the basis of the terminal ID attached to the current location information. If not registered yet, a new location record is generated on the basis of this current location information, and stored in the current location table in correspondence with this terminal ID. Also, a history table is generated anew in correspondence with this terminal ID.

On the other hand, if already registered, the previous current location information (latitude and longitude) is acquired from the location record corresponding to the terminal ID, and compared with the current location information as received. If these latitude and longitude values are approximately the same (for example, only with a difference of at most 10 meters or the like), the current location information is discarded without further processing.

Conversely, if the current location information as received substantially differs from the previous current location information stored in the current location table, a new location record is added to the history table corresponding to the terminal ID on the basis of the location record of the current location table corresponding to the previous current location information. The location record of the current location table corresponding to this terminal ID is updated with the current location information, Cell-ID, receiving sensitivity and measurement date/time as received.

Accordingly, the staying period for which the mobile communication device has stayed in the place designated by a certain location record corresponds to the differential time between this location record and the next location record in the history table.

For example, if a location record at 13:30 may be followed by a location record at 14:30 in the history table corresponding to a mobile communication device, the two location records indicates that the mobile communication device has been located in a certain place for a hour. Namely, if a sequence of location records have continuous time fields in units of cycles of measuring the current location, this sequence indicates that the user was in transit. Conversely, if adjacent location records have discrete time fields, these location records indicates that the user stayed in the place corresponding to the location field of the former location record thereof. Accordingly, the date and time fields of each location record appropriately indicate the date and time in which the mobile communication device has arrived (visited) at the place corresponding to the location field except that the user was in transit. The date, time and location of these fields will be called a visit date, a visit time and a visited location hereinbelow because the location records in transit are not important in this context. The Cell-ID and receiving sensitivity fields in the history table can be utilized, for example, for evaluating the reliability of the latitude and longitude. On the other hand, the staying period for which the mobile communication device has stayed in the place corresponding to the latest location record in the history table corresponds to the differential visit time between this latest location record and the location record in the current location table corresponding the terminal ID. Incidentally, the staying period in the current location corresponds to the difference between the current time and the visit time of the location record in the current location table corresponding the terminal ID.

Alternatively, each location record of the current location table may be stored as the latest location record in the history table corresponding to this each location record. Namely, the current location table consists of reference pointers to the latest location records of the history tables corresponding to the mobile communication devices respectively. In this case, the staying period can be calculated only in the history table.

Figure 4:
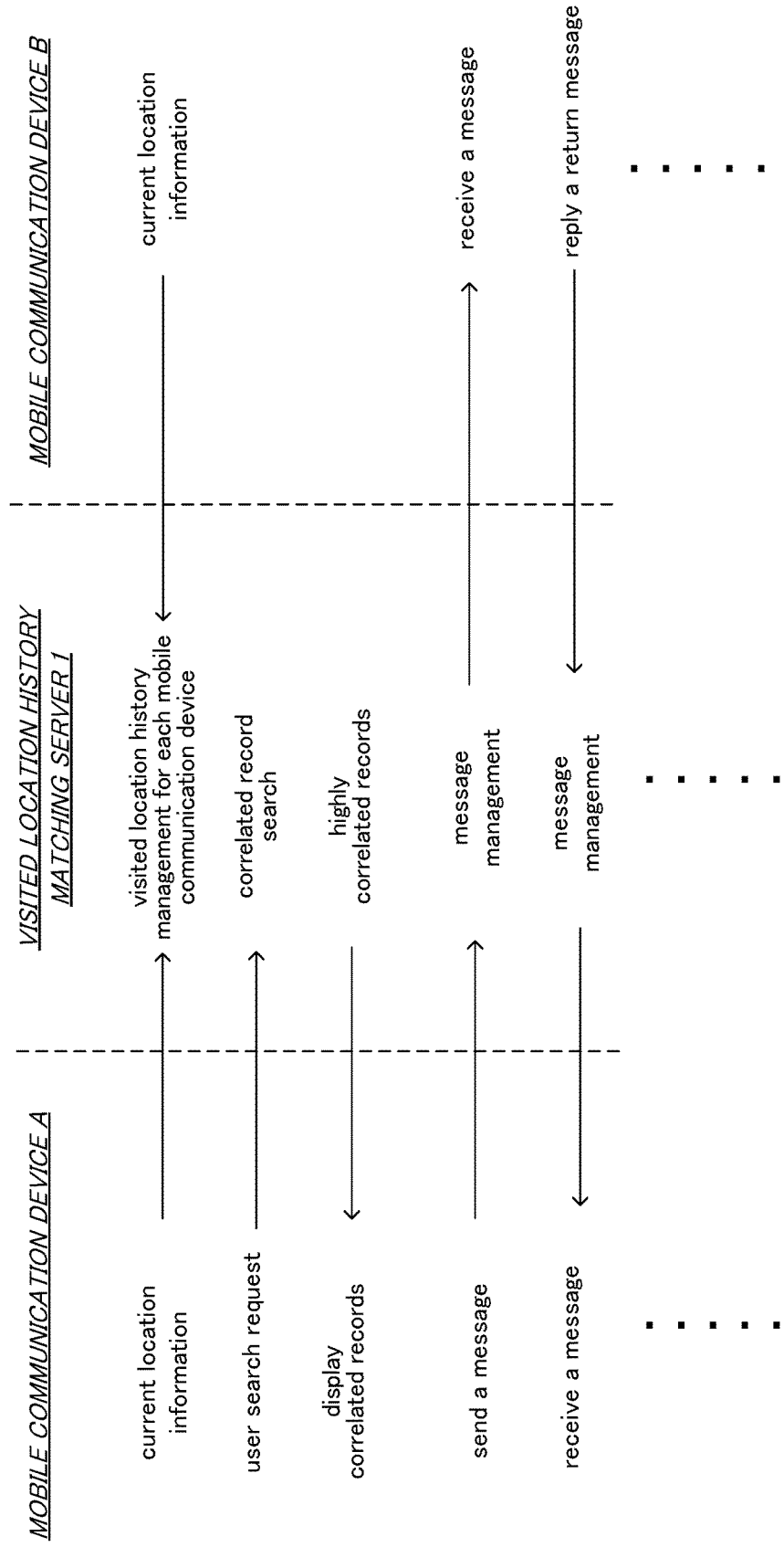
FIG. 4 is a view for explaining the exchange of signals in an actual usage scenario of the user similarity provision method in accordance with the embodiment 1 of the present invention.

Next, the user similarity provision method of this embodiment will be explained in accordance with an actual usage scenario. FIG. 4 is a view for explaining the information exchanging scheme of the visited location history matching system. For example, it is assumed that the user A with the mobile communication device 3A is having coffee in a cafe. He may want to talk to someone and take the mobile communication device 3A followed by clicking the icon of the resident program. Usually, since the resident program has already been opened (memory-resident) in the mobile communication device 3A, the resident program transmits a user search request to the visited location history matching server 1 rather than invoking a second instance. The user search request is transmitted together with the current location information and the terminal ID of the mobile communication device 3A.

When the user search request is received, the visited location history matching server 1 searches the current location table for identifying the users (mobile communication devices) located in the vicinity of the current location of the mobile communication device 3A. For example, the users within 50 meters from the mobile communication device 3A are identified. If the number of identified users is less than a predetermined number, for example, if only three or less users are identified, the search range is expanded so that, for example, the users within 100 meters are identified.

On the other hand, the history table corresponding to the terminal ID of the mobile communication device 3A is searched for extracting location records (hereinafter referred to as specific staying location records) each of which indicates that the user of the mobile communication device 3A has stayed for a predetermined period, e.g., one or more hours at the place corresponding to this location record. The visited location history matching server 1 then searches the history tables of the identified users for location records each of which satisfies a predetermined similarity relationship with one of the specific staying location records. The predetermined similarity relationship is satisfied by a location record if the staying period thereof is no shorter than a predetermined period, for example 30 minutes, and that the distance of the visited location from that of the specific staying location record is no greater than a predetermined distance, for example 1 km. The location records hit by this search are arranged in descending order of correlation with the visited location history of the mobile communication device 3A. This arrangement can be performed, for example, by the following procedure.

First, priority is given to the location record of a user who has stayed at the same visited location and same visit time of the specific staying location record. If there are a number of such location records, higher priority is given to the location record which indicates that the user of this location record and the user of the mobile communication device 3A have stayed together for a longer period. The record having a staying period overlapping the staying period of the specific staying location record for a longer period is given a higher priority.

Next, higher priority is given to a user who has stayed at the same visited locations as the user of the mobile communication device 3A (regardless whether or not at the same time) for a longer total period of the staying periods thereof.

FIG. 5 shows an example of the list of the above location records displayed on a mobile communication device. In this case, the highest priority is the location record at the top of the list indicating that the user of a terminal ID "415bfa41" has stayed near the Honmoku Local Park in Yokohama from 11:48 on Aug. 28, 2011 for 4 hours, 25 minutes. Also, the visit date, visit time and staying period of each location record are followed by brackets in which are shown the visit date, visit time and staying period of the mobile communication device 3A when staying the same place. Accordingly, it is known from the list that the user of the mobile communication device 3A has stayed with the user of the terminal ID "415bfa41" at the same place and the same time for more than four hours.

Incidentally, the names of places shown in the list can be obtained by reverse-geocoding of geographic coordinates (latitude and longitude) to street addresses and converting the street addresses to the names of places by the use of an online telephone book service. However, when an online telephone book cannot be used for this purpose for example in the middle of a mountain or an ocean, geographical names such as Mt. and * Coast are displayed by the use of a database in which geographic coordinates correspond to the names of the places. Since even GPS has some margin of error, expression "or thereabouts" is used for the names of places.

When clicking the name of a place ("The Honmoku Local Park" in this case), the resident program searches the Web with "The Honmoku Local Park" as a search term and displays search results. The user of the mobile communication device 3A may remember the time when he went to a jazz concert from the search result. Also, when clicking a terminal ID ("415bfa41" in this case), the location records of the user of the terminal ID can be extracted and displayed as illustrated in FIG. 6.

Figure 7:
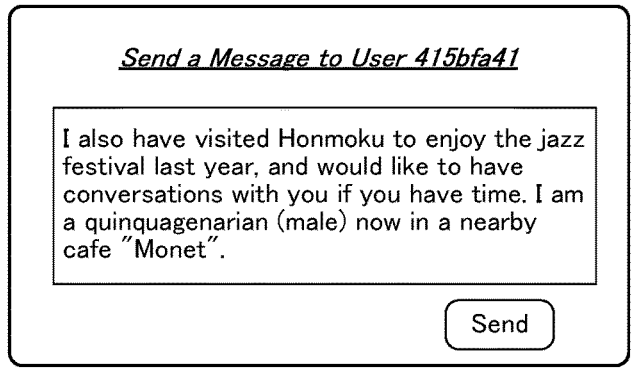
FIG. 7 is a view for showing a message edit screen for sending a message to another mobile communication device in accordance with the embodiment 1 of the present invention.

It is assumed that the user A wants to have a talk with the user B of the terminal ID "415bfa41". The user A then clicks a button "Send Message" to open a message edit screen as illustrated in FIG. 7. After inputting a message to the message edit screen, the user A can send the message to the mobile communication device 3B of the terminal ID "415bfa41" by clicking the "Send Message" button. Specifically, the visited location history matching server 1 first receives the message from the mobile communication device 3A. Next, when receiving current location information from the mobile communication device 3B, the visited location history matching server 1 transfers the message to the mobile communication device 3B together with an acknowledgement of the current location information.

Figure 8:
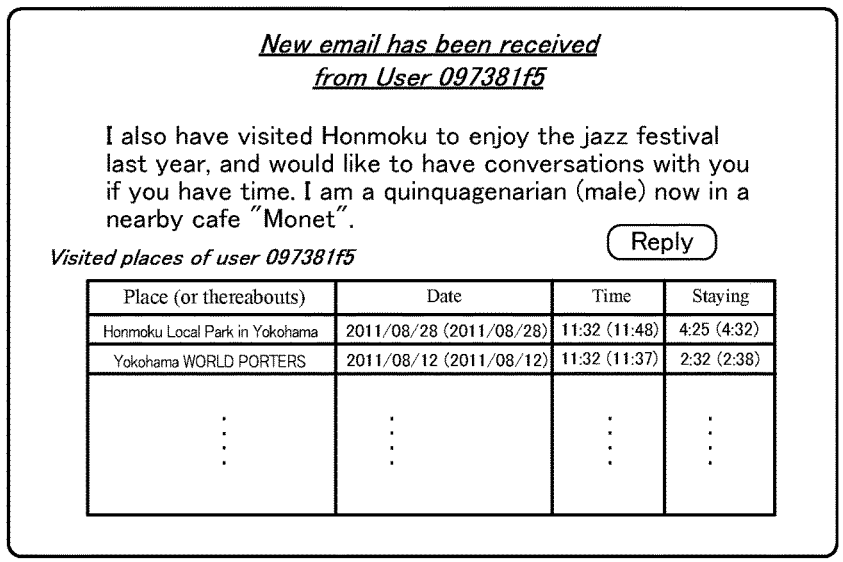
FIG. 8 is a view for showing a screen in which the received message is displayed in accordance with the embodiment 1 of the present invention.
Figure 9:
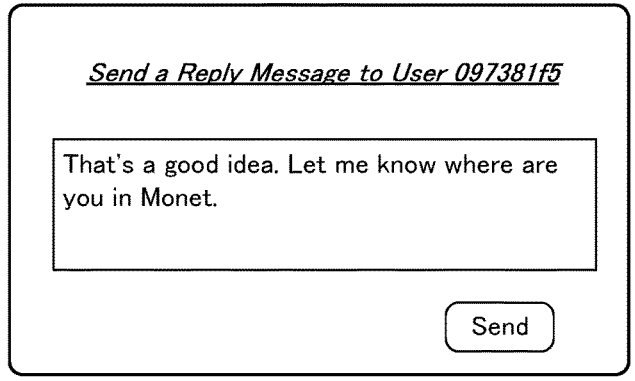
FIG. 9 is a view for showing a message edit screen for sending a reply message in accordance with the embodiment 1 of the present invention.

This message is accompanied with the visited location history of the user A in addition to the message body as edited as illustrated in FIG. 8. The location records of the visited location history are displayed in descending order of correlation with the visited location history of the mobile communication device 3B, so that the similar location records are displayed as FIG. 6. The user B can get certain information about what kind of person the user A is. The user B can send a reply to this message by clicking a "Reply" button to open a message edit screen as illustrated in FIG. 9, editing a reply message and clicking a "Send" button. The user A and the user B can exchange further messages if desired. Incidentally, the sending and receiving process is performed by the resident program installed in the mobile communication device 3A and the mobile communication device 3B and the visited location history matching server 1 in cooperation.

The above process of updating the location information history may includes routines of handling exceptions, i.e., that no location information is available, that the Internet cannot be accessed, and that the resident program has temporarily stopped its operation.

No location information is available, for example, when a sufficient number of GPS satellites cannot be found and Wi-Fi triangulation is not available. In such a case, rough location information is acquired by cell phone tower triangulation to generate a location record with a receiving sensitivity of 0 so that this location record is only reference information and cannot be used in this user similarity provision method. This location record serves also as a padding record between valid location records. The Internet cannot be accessed, for example, when the mobile communication device cannot have any reception. In such a case, the resident program saves location records in the mobile communication device and, when the Internet access becomes available, these location records are transmitted to the visited location history matching server 1. The resident program is temporarily stopped its operation, for example, when the battery of the mobile communication device runs out or when the mobile communication device is turned off. In such a case, after restarting, the resident program resumes transmission of location records. On the other hand, the location record, which is transmitted from the resident program just after restarting and received by the visited location history matching server 1, has a visit time which is not subsequent to the visit time of the latest location record (current location record) stored in the visited location history matching server 1, i.e., the difference between these visit times is longer than the current location acquiring interval. In this case, the visited location history matching server 1 generates an invalid location record subsequent to the latest location record in the history table and saves the received location record in the current location table. The visit date and visit time of the invalid location record are those of the location record which would have been received by the visited location history matching server 1 after receiving the latest location record if the resident program had not been stopped. The other fields of the invalid location record are set to 0 respectively to indicate that this record is invalid.

Incidentally, if no location information is available, the user can request the visited location history matching server 1 to insert a location record to the history table of the history database by designating a visit date, a visit time, a visit location and a staying period. In this case, the user can send an insertion request together with text such as "20130101: Hotel Okura in Toranomon (Tokyo) at 15:00 for 4 hours". For example, after posting a message reporting the visit, the text of the message can be used for this purpose. The visited location history matching server 1 parses the text to extract a visit date, a visit time, a visit location and a staying period, generates a location record from this information, and insert this location record into an appropriate position of the history table (which may be occupied by an invalid record) in accordance with this extracted information.

Figure 10:
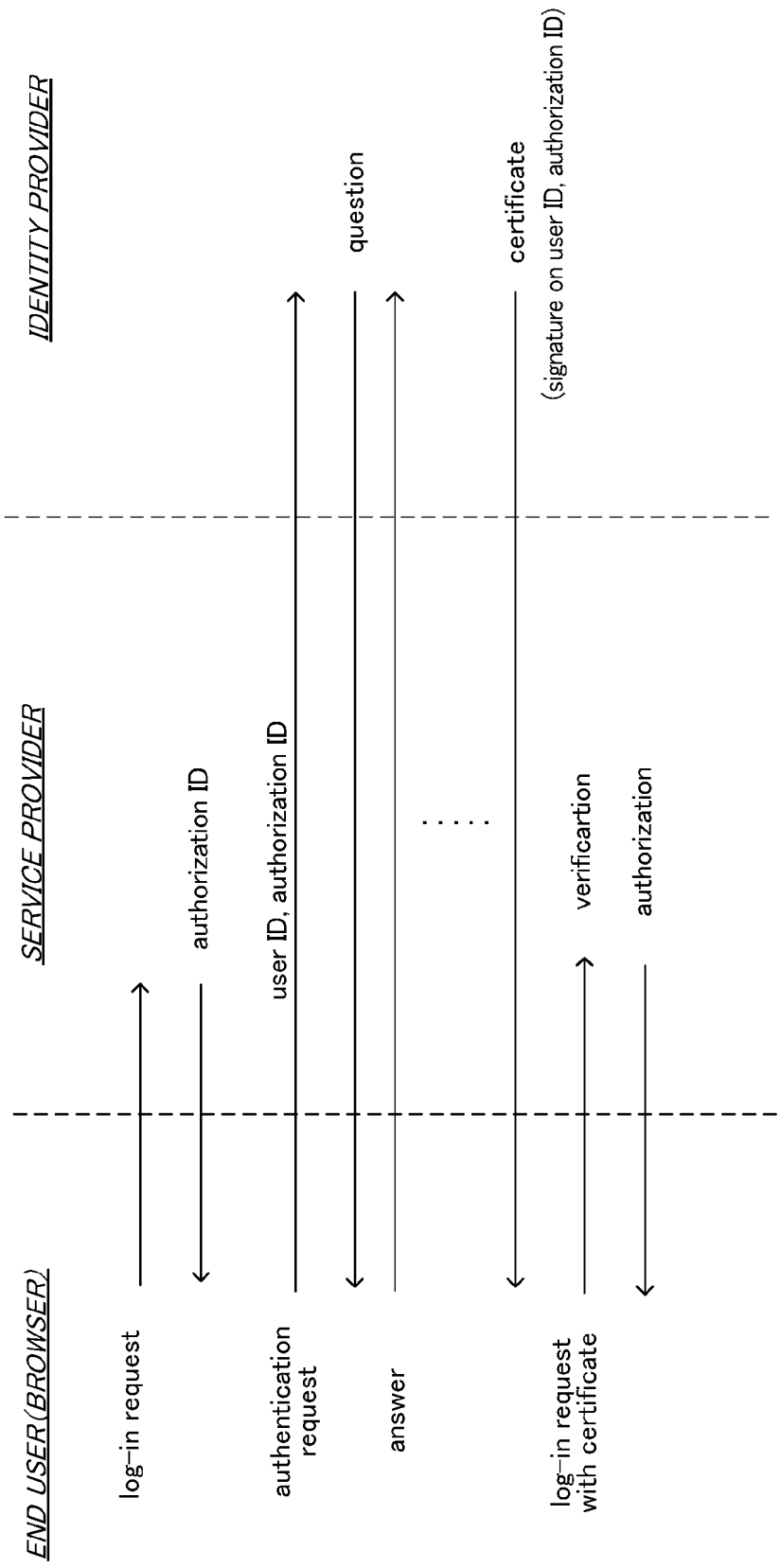
FIG. 10 is a view for explaining the operation of a visited location history matching server serving as an identity provider in a scenario that a user logs in a service provider through a browser by the use of the identity provider.

The user similarity provision method of the embodiment 1 is implemented with the visited location history matching server 1 which manages the location information histories of a number of users. A system in which the location information histories of individuals are accumulated can be used as an identity provider capable of authenticating user identities by the use of the location information histories. In what follows, the operation of the visited location history matching server serving as an identity provider will be explained with reference to FIG. 10 in a scenario that a user logs in a service provider through a browser by the use of the identity provider.

Incidentally, the service provider which performs a log-in process of users through identification by the identity provider has to store the URL and public key of the identity provider. The browser, the service provider and the identity provider communicate with each other through SSL.

Figure 11:
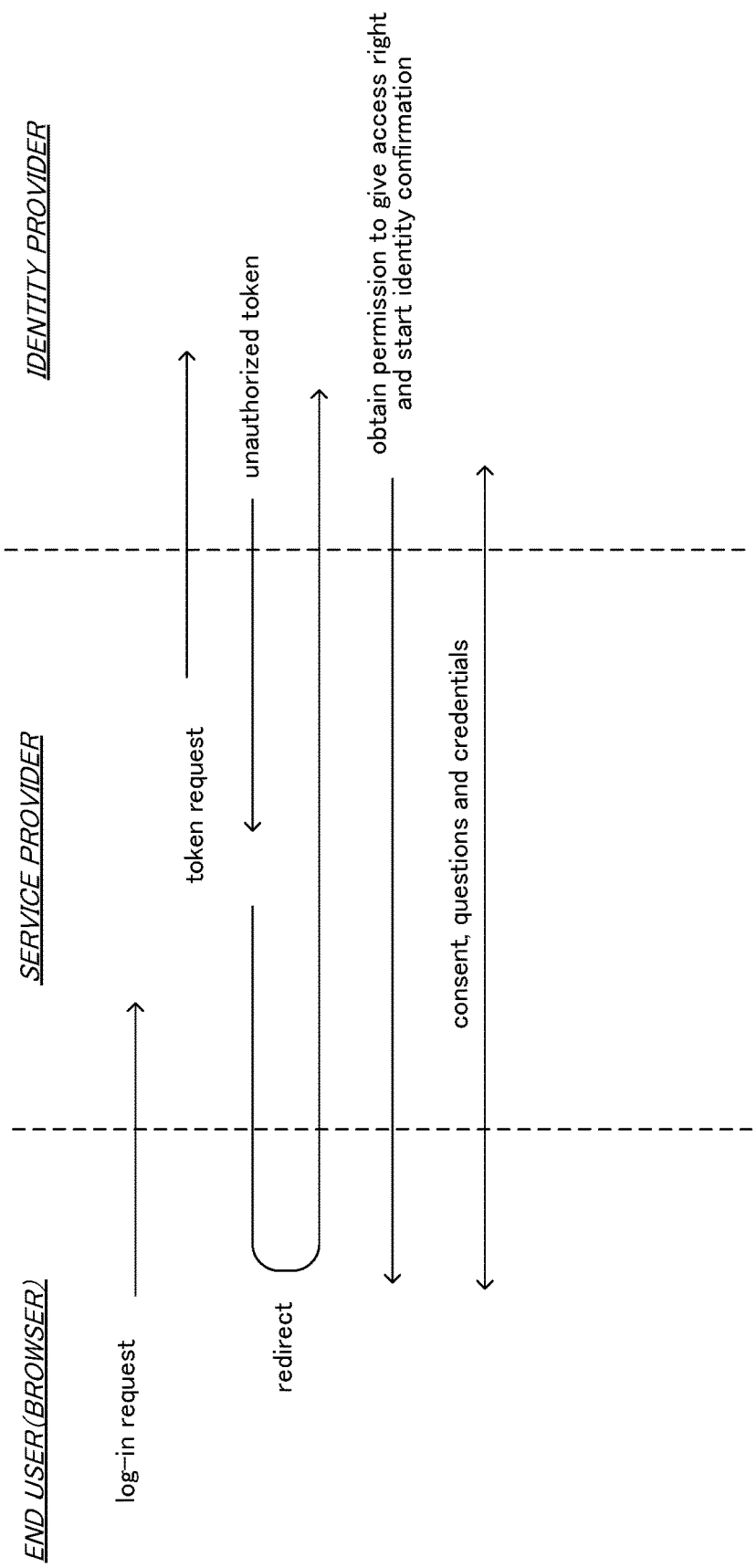
FIG. 11 is a view for showing a log-in dialog of the service provider to verify the identity of a user through the authentication by the identity provider.

First, the user accesses a log-in dialog of the service provider through the browser as shown in FIG. 11. The log-in dialog includes a form in which the user can enter a user ID. When the user presses a send button after entering the user ID, an authentication request is redirected to the identity provider. This authentication request is transmitted to the identity provider together with the user ID, the URL of this service provider and an authorization ID.

This authorization ID is issued by the service provider and associated with the user ID and the identity provider. Also, the authorization ID is effective only for a predetermined effective period, for example, twenty minutes. The user has to finish the log-in process within this effective period. Next, an authentication process is performed between the browser and the identity provider as follows.

Figure 12:
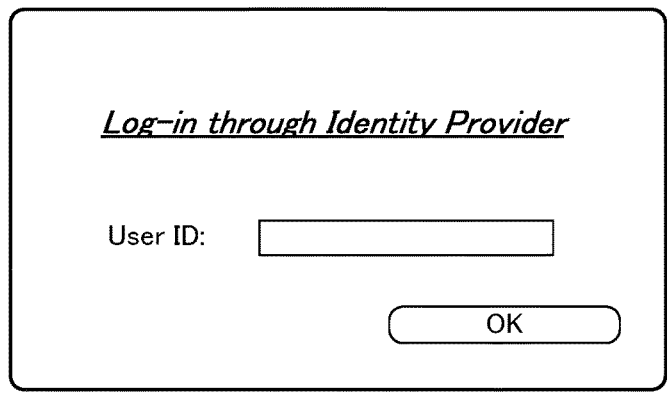
FIG. 12 is a view for showing a question dialog in which a multiple-choice question is displayed by the identity provider.
Figure 13:
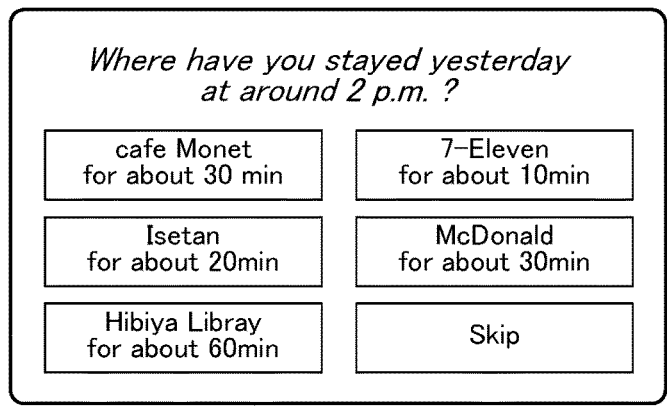
FIG. 13 is a view for showing another question dialog in which a multiple-choice question is displayed by the identity provider.

First, the identity provider opens a question dialog as illustrated in FIG. 12 or FIG. 13 in which is displayed a multiple-choice question which is related to the location information history of the user and which can correctly be answered only by that user. The multiple-choice question which is related to the location information history are based on information about, for example, in what place (which nation, which country, which city, which area, which establishment, which mountain, which beach or the like), at what time (what hours before, what days before, what month, what season, what year or the like) and for what length of period (what minutes, what hours or the like) the user has stayed. The user can select one of a plurality of choices (five choice buttons and one skip button in this case) in response to a multiple-choice question.

The user is asked such five multiple-choice questions. If the user can correctly answer three or more out of the five questions, the user is authenticated. The five questions may include one or more question consisting only of incorrect choices. In this case, the correct answer is skipping that question. Alternatively, while a password is set up in advance, password authentication may be invoked when, of five answers, three are correct and two are wrong. In this case, if three answers are wrong, the authentication fails, and if four or more answers are correct, the authentication succeeds.

If the user is authenticated, the identity provider generates an electronic certificate (RSA, ECDSA or the like), and redirects the browser to the URL of the service provider which receives the electronic certificate. This electronic certificate certifies the authentication of the user associated with the user ID and the authorization ID. After receiving the electronic certificate, the service provider verifies this certificate with the public key of the identity provider, and permits the user to log in the service provided by the service provider.

Next is a description of an example of how to generate multiple-choice questions from the location information history of the user to be authenticated. First, this location information history is searched for extracting two location records of today and/or yesterday which indicates that the user has stayed in certain places respectively for 10 to 20 minutes. Since the location records are very fresh, the user will remember the details of the events on these days. Accordingly, for example, a location record extracted may generates a choice that "you have stayed yesterday near the cafe Monet at around 2 p.m. for about thirty minutes".

Next, two location records within the past 7 days are extracted from the location information history in the same manner. Furthermore, one location record is extracted from location records before that. However, the older the location record is, the more distant from the usual moving range the selected place is. Also, if the location record is very old, for example, several years old, the question uses long time units such as "Spring in 20XX".

After extracting five location records from the location information history of the user, four incorrect location records are selected for each extracted location record to construct one question. Each incorrect location record is obtained by selecting another user at random, selecting one incorrect location record candidate of this another user at random, and confirming this candidate is truly an incorrect location record. The confirmation is performed by fuzzy searching the location information history of the user to be authenticated for each incorrect location record candidate. If a location record is hit in the location information history, this candidate is discarded followed by selecting another candidate.

On the other hand, while each multiple-choice question has six choices (including skip), there is inserted one question per six questions consisting only of incorrect choices. For example, a correct location record extracted may be modified as an incorrect choice that "You have stayed yesterday near the cafe Monet at around 12 a.m. for about thirty minutes" by slightly changing the correct location record in order that the user can notice. In this case, the correct answer is a skip.

Incidentally, while there is a button captioned "skip" in the above example, any appropriate caption such as "other" can be used instead. Also, in the above example, a user is identified by a unique terminal ID which has been assigned when downloading the resident program. This terminal ID can be used as the ID of the user. Of course, a user name which is desired by a user may be associated with the terminal ID and used to identify the user in place of the terminal ID itself which is merely a number for managing users. Furthermore, needless to say, the identity confirmation can be performed by the above procedure not only through a mobile communication device but also through any other terminal having a communication capability, for example, a personal computer, a tablet terminal, a smartphone other than the mobile communication device. Namely, while the visited location history is accumulated by the mobile communication device of a user as the base data for generating credentials, this base data can be utilized for confirming user identity independent of the mobile communication device.

Embodiment 2

The embodiment 1 relates to a method for simply authenticating a user. The service provider may provide a service which makes use of other resources of a user (for example, user data of an SNS) which can be accessed after identity confirmation of the user. In this case, the identity provider can determine whether to give the service provider the right of accessing the resources of the user.

Meanwhile, the entity managing the identity provider can be managing also the resources of users. Also, another service provider than the identity provider may be managing also the resources of users. Anyway, the service provider, the identity provider, the another service provider and the mobile communication device (and a personal computer used by the user for performing necessary steps of the identity confirmation) as described above are connected to the Internet.

Figure 14:
FIG. 14 is a view for explaining the information exchanging scheme of an identity confirmation method in accordance with an embodiment 2 of the present invention.

In what follows, with reference to FIG. 14, it will be explained how to authorize the right of access by the use of the identity confirmation method as described above. It is assumed, however, that a location information history is accumulated and managed in the visited location history matching server, and that the location information history of a user is available.

It is assumed that a user wants to use a service of a service provider which requires user information managed by another service provider so that the user has to give the service provider the right of accessing the user information. The user thereby sends an authentication start request to the service provider to obtain the access right.

After receiving the authentication start request, the service provider sends a token request to the identity provider. This token request contains authentication information about which resource the service provider can be accessed, whether the service provider can modify the resource, the validity period of the access right and so forth.

After receiving the token request, the identity provider returns an unauthorized token to the service provider. The service provider confirms and transfers this unauthorized token to the user who redirects the unauthorized token to the identity provider.

Thereafter, the authentication of the user is performed for identity confirmation between the user and the identity provider. First, after receiving the unauthorized token, the identity provider presents the details of the access right to be given to the service provider, and obtains permission from the user to give the access right and start identity confirmation. The user confirms the details of the access right and agrees to give the access right to the service provider.

The identity confirmation method of the present invention as described above is then performed. This is transmission of credentials from the user. Namely, the identity provider poses a plurality of multiple-choice questions, for example, five questions. If the user can correctly answer three or more of the five questions, the user is authenticated.

If the identity confirmation succeeds, the identity provider sends an authorized token to the user. This authorized token is re-directed from the user to the service provider. The service provider accesses the resources of the user by the use of the authorized token. For example, the user information can be read through Web APIs.

Embodiment 3

In the above embodiment, identity confirmation is performed by multiple-choice questions. However, in this embodiment 3, the identity provider poses a direct question such as "Where were you staying on xxxx/xx/xx?", and requests the user to directly answer the question. However, since it is cumbersome to answer such a question by inputting words and an answer consisting of words is often ambiguous, the user can answer through a map. The following procedure replaces the procedure corresponding to "question" and "answer" in FIG. 10. The other procedure is same as in the embodiment 1 or 2.

Namely, the user accesses a log-in dialog of the service provider through the browser as shown in FIG. 12. The log-in dialog includes a form in which the user can enter a user ID (user name). When the user presses a send button after entering the user ID, an authentication request is redirected to the identity provider. The authentication request includes the URL of this service provider and an authorization ID together with this user ID.

Figure 15:
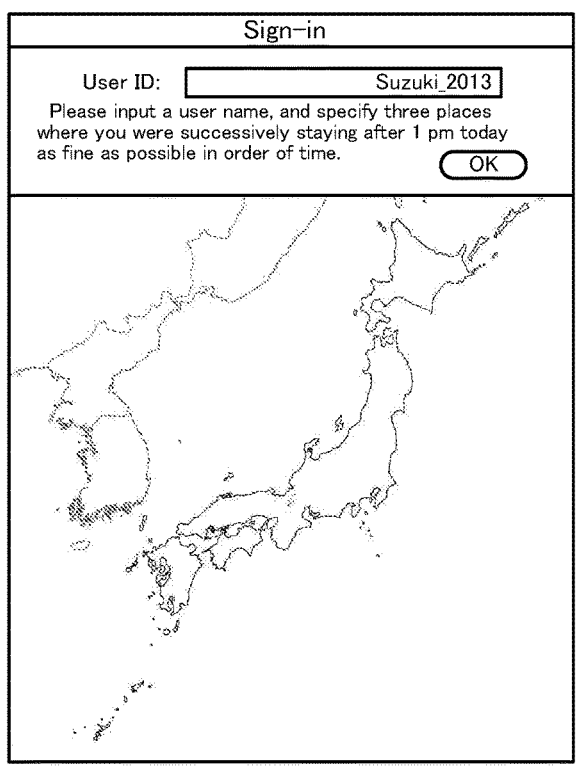
FIG. 15 is a view for showing a window in which a question is posed with a whole map of Japan for use in an identity confirmation method according to an embodiment 3 of the present invention.

First, the identity provider displays the whole map of Japan as illustrated in FIG. 15, and poses a question about a past staying place of the user, for example, "Please input a user name, and specify the place where you were staying at 1 pm on November 3 as fine as possible". The more recent the time relating to the question is, the closer to the usual moving range the places in a question are selected. Conversely, the more timely distant, the more remote from the usual moving range the places are selected. The user is informed of this selection algorithm so that, for example, if the question is of a year ago, the user can answer the question by recalling the memory of personal and business trips a year ago. Namely, after inputting a user name uniquely corresponding to the terminal ID, the user answers the question by recalling the memory on the date/time designated by the question.

Figure 16:
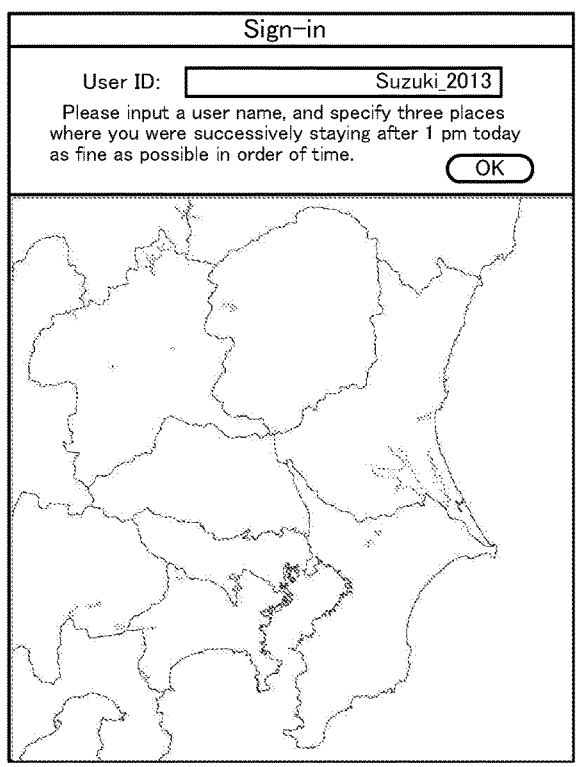
FIG. 16 is a view for showing a window in which the question is posed with an expanded view of the map for use in the identity confirmation method according to the embodiment 3 of the present invention.
Figure 17:
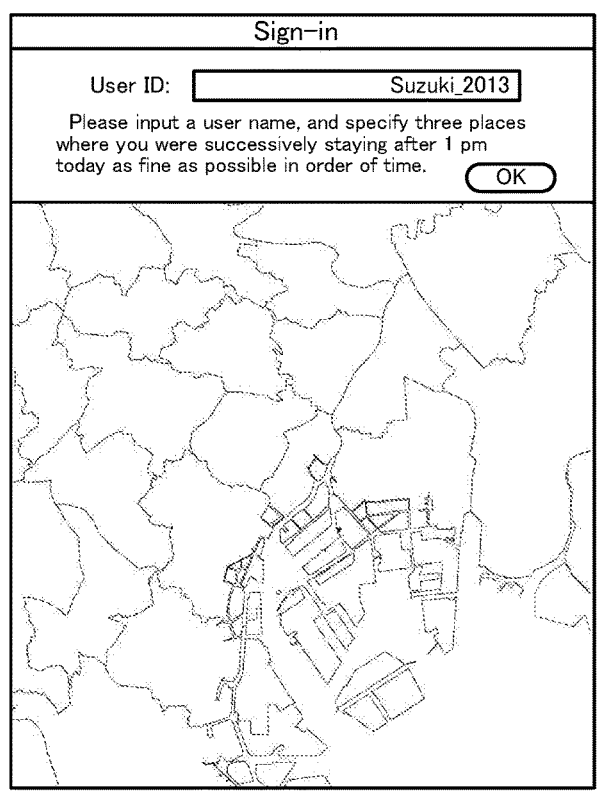
FIG. 17 is a view for showing a window in which the question is posed with a further expanded view of the map for use in the identity confirmation method according to the embodiment 3 of the present invention.
Figure 18:
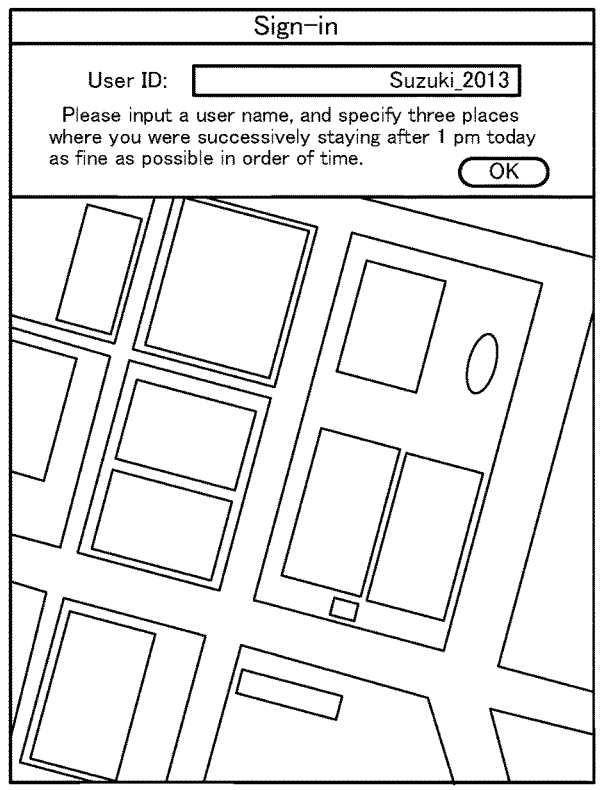
FIG. 18 is a view for showing a window in which the question is posed with a further expanded view of the map for use in the identity confirmation method according to the embodiment 3 of the present invention.

For example, if the user was staying in a certain place of Tokyo, this place can be input by the following steps. First, the user clicks (taps) near Tokyo in the whole map of Japan as illustrated in FIG. 15. The identity provider then displays an expanded map around Tokyo as illustrated in FIG. 16. The user clicks a certain area of the expanded map where he was staying. In response to this, the identity provider displays again a further expanded map therearound as illustrated in FIG. 17. The user clicks near the certain place of Tokyo where he was staying in the further expanded map. The identity provider then displays a street map around the place he clicked as illustrated in FIG. 18. The user shifts the displaying position of the street map, if necessary, to display the certain place where he was staying, and clicks this place. Finally, the user presses an OK button displayed above the map to finish the input.

If the place which is input is correct, the identity provider determines that the user correctly answered. However, in this case, the result is not simple as whether the answer is correct or not, but given as a score which becomes higher as the input place is closer to the correct place stored in the history table. For example, if the difference between the input place and the correct place is within 20 m, the score is 10. If the difference is between 20 m and 100 m, the score is 9 or the like. However, since the difficulty level becomes high if the question relates to an older period, a higher score is given to a question relating to an older period.

The displayed map can be expanded/reduced by pinching in/out, and moved by dragging if desired. For example, if the user was travelling abroad on business, the map displayed as shown in FIG. 15 is pinched out and dragged to show an area including a foreign country to display the visited place. Also, when the user has only a dim memory, he presses the OK button to input an answer when the displayed map has an intermediate scale size as illustrated in FIG. 17. In this case, even if the user clicked near the correct place, the score is low such as 1 or 2. If the user presses the OK button to input an answer while the displayed map does not include the correct place, the score is a minus value. While a maximum of 5 questions are posed, the identity provider determines that the identity is confirmed when the total score exceeds 20.

After authenticating the user, the service provider generates and redirects an electronic certificate (RSA, ECDSA or the like) to the URL of the service provider. The electronic certificate associates the user ID with the authorization ID to authenticate the user. The service provider verifies this electronic certificate with the public key of the identity provider, and permits the user of the user ID to log in. This is the same as that of the embodiment 1.

Embodiment 4

In the above embodiment 3, the identity provider poses a question relating to one place the user was staying, such as "Where were you staying on 2013/12/24?". However, in this embodiment 4, the identity provider poses a question to request the user to show a route pattern including a plurality of staying places in stead of a single place. For example, the identity provider poses a question such as "Please input a user name, and specify three places where you were successively staying after 1 pm today as fine as possible in order of time. The other process is the same as that of the embodiment 3.

Figure 19:
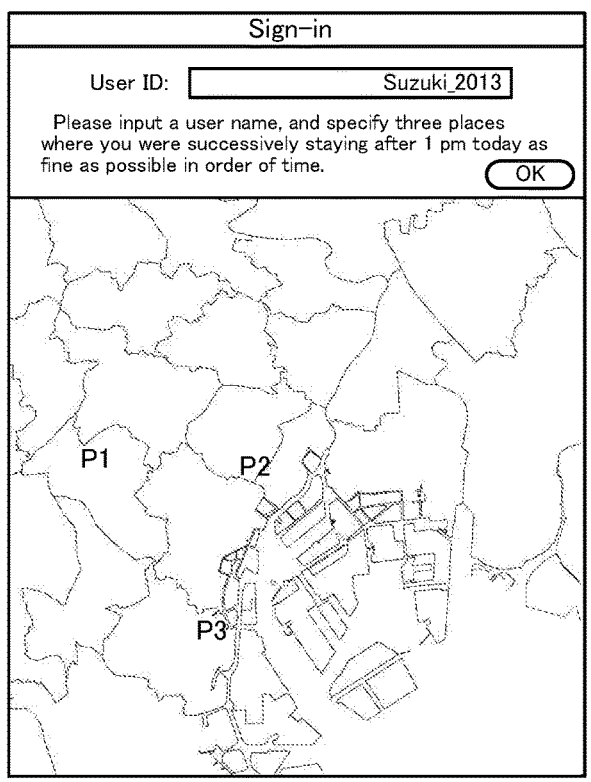
FIG. 19 is a view for explaining how to answer in response to a question requiring a user to specify three places where the user were successively staying according to the embodiment 3 of the present invention.

In response to this question, if the user clicks (taps) points P1, P2 and P3 in this order on a map as illustrated in FIG. 19. This operation means, for example, that the user inputs a route pattern in which he stayed in the point P1 about 1 pm on the 3rd of November, and then moved to the point P2, and further moved to the point P3.

Receiving this answer, the identity provider refers to the history database of the user, and confirms whether or not there is a route pattern corresponding to the points P1, P2 and P3 after about 1 pm on the 3rd of November. If there is such a route pattern in the history database, for example, the score is 10. If there are three points in the history database corresponding to the input three points in a wrong order, a lower score such as 5 is given. If there are two points in the history database corresponding to two of the input three points and the remaining point is wrong, a further low score such as 3 is given. If there is one point in the history database corresponding to one of the input three points and the remaining two points are wrong, for example, a further low score such as 1 is given. Namely, the score is increased or decreased in accordance with the degree of similarity of the route pattern.

The answer to this type of a question includes three places, so that the number of questions to be posed may be smaller than that of the embodiment 3. For example, the identity provider poses three questions at a maximum. The identity provider determines that the identity of the user is confirmed when the total score exceeds a predetermined points (for example 10).

Since the identity provider requests a route pattern which is more difficult than a single place, it is difficult to answer if questions relates to old periods. Accordingly, questions are prepared from the location information history within past three days in order that each route pattern includes distinctive places. For example, when the three points are located too close to each other, or when the staying period is too short, the identity provider redoes selection of a route pattern again.

Also, the identity provider may allow the user to select the selection settings of the area and period in which route patterns are generated. For example, the area and period of route patterns can be accorded with the trend in behavior of the user, for example, "motion within 30 m from 10 minutes ago to 5 minutes ago" to make selection effective. However, this identity provider can prepare questions which do not accord with the selection settings, if necessary. For example, if the user does not move from a certain place for more than an hour, the identity provider cannot prepare any question in accordance with the above selection settings. In such a case, the identity provider prepares questions from the records more than an hour ago.

Also, the user can input a route pattern by sliding a finger (or cursor) on a map to continuously pass three points without the finger (or cursor) being lifted. This movement makes it possible to quickly input a route pattern if the question relates to records several tens of minutes ago and the user has a clear memory. Furthermore, in this case, it is possible to give meaning to the speed of a finger (or cursor) moving between two points. For example, if the user moved from the point P1 to the point P2 by car and then moved from the point P2 to the point P3 by foot, the user can input this route pattern by shifting a finger (or cursor) from the point P1 to the point P2 at a high speed and then shifting the finger (or cursor) from the point P2 to the point P3 at a low speed. These speeds are detected by the terminal and sends to the identity provider. The identity provider receives these speeds, compares it with the records of the history database corresponding thereto, and reflects the result in determining the score.

The identity provider detects this speed, compares it with the records of the history database corresponding thereto, and reflects the result in determining the score.

In the case where the terminal is capable of detecting the writing pressure (the pressure of the finger (or cursor) on the monitor), the terminal also transmits the writing pressure to the identity provider. For example, the user can input a longer staying period in a particular place by pressing this place under a stronger pressure. Conversely, the user can input a shorter staying period in a particular place by pressing this place under a weaker pressure. The identity provider detects the writing pressure and reflects the result in determining the score.

Figure 20:
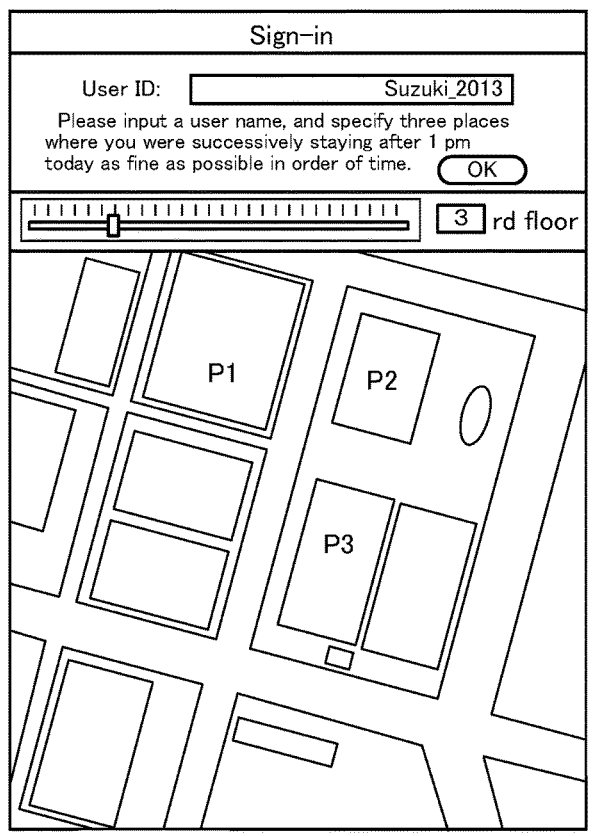
FIG. 20 is a view for explaining how to answer in response to a question requiring a user to specify three places where the user were successively staying according to the embodiment 3 of the present invention.

Furthermore, when specifying a certain building as a staying place, it is possible to add storey information about which floor the user was staying. In this case, as illustrated in FIG. 20, a track bar may be displayed in the screen showing a map in order to makes it possible to input the storey information. After designating the certain building on a map, user can input the storey information by sliding the track bar. If the storey information matches the record, the score is increased.

Furthermore, fingerprint authentication may be performed in combination with the above identity confirmation by the use of a fingerprint sensor which is implemented on the monitor of the terminal through which authentication is performed. In this case, a fingerprint is detected at the same time as a staying place is input with a finger. The authentication is performed by comparing the detected fingerprint with fingerprint information registered in advance to calculate a fingerprint score. The user is authenticated by combining the calculated fingerprint score and the score which is obtained in accordance with the aforementioned identity confirmation. This combination furthermore improves the security of identity confirmation. Alternatively, the fingerprint authentication may be replaced by vein authentication.

Embodiment 5

The server of the identity provider of the above embodiments receives current location information of each mobile communication device periodically measured by the resident program installed therein, and manages the current location information as the location information history. However, the mobile communication device may not send current location information to the server of the identity provider, but manages the current location information within the mobile communication device itself.

In this case, the location information history is used to log in the system of the mobile communication device itself. For example, when the mobile communication device is powered up, the mobile communication device performs the identity confirmation as has been discussed above by the use of the location information history, and the user can use the mobile communication device only after the identity confirmation succeeds. Likewise, when the mobile communication device resumes from its stand-by state, the mobile communication device performs the identity confirmation to unlock the system, and the user can use the mobile communication device only after the identity confirmation succeeds.

This method is applicable to other instruments than mobile communication devices. For example, while a GPS system is implemented with an automobile, a heavy machine or the like machine which is operated by a person, the automobile or machine can be operated only when the identity confirmation succeeds. Namely, identity confirmation is performed by posing questions about the route on which the automobile or machine has moved. If the user correctly answers questions, the automobile or machine can be started. In the case of a working machine, the working history thereof is accumulated, and used to perform the identity confirmation in place of the location information history. For example, the identity confirmation is performed with questions such as "when, what and how much the working machine has produced?". If the user can correctly answer the questions, the identity confirmation succeeds so that he can start up the working machine.

Embodiment 6

The location information of the user is transferred to the server and accumulated as a location information history. However, the location information history of a user is related to the private affairs of the user, so that there seem a number of users who hate having an external server accumulate such an action history. Accordingly, this embodiment 6 is implemented to consider user's privacy.

For this purpose, the location information of a user is encrypted at the mobile communication device of the user and transmitted to the server. In what follows, the method of encrypting the location information and the usage of the location information will be explained in details with reference to FIG. 21 through FIG. 23. A user who wants to use this identity confirmation method has to download a resident program from the server of the identity provider and install the resident program in a mobile communication device carried by the user in the same manner as in the aforementioned embodiment 1.

When this resident program is used, an encryption key is determined as an initial setting. This encryption key can be generated by, for example, processing a character string input by a user with a hash function such as SHA-1 and extracting upper 128 bits. Alternatively, the resident program can generate a 128-bit random number as an encryption key. Once the encryption key is generated, the user need not be aware of the function thereof.

The resident program then starts periodically measuring the current location information to obtain latitude and longitude data. This latitude and longitude data is 64-bit data containing a latitude of 32 bits and a longitude of 32 bits, encrypted with the encryption key, and transmitted to the server of the identity provider together with time information indicative of the current time.

The encryption method is performed as shown in FIG. 21. First, the current time in the form of a 64-bit Unix time is concatenated to the 128-bit encryption key to create 192-bit data. The 192-bit data is processed by a hash function (SHA-1 in this example) to generate a hash value of 160 bits. The upper 64 bits of the hash value are used as an encryption bit sequence. The latitude and longitude data of 64 bits is exclusive ORed with the encryption bit sequence to generate encrypted latitude and longitude data. This encrypted latitude and longitude data is transmitted to the server together with the current time.

This 128-bit location information record contains current location information (true current location information). In addition to this, the resident program generates 128-bit location information records containing false current location information. The false current location information is generated in the same manner as the true current location information except that false latitude and longitude are used in place of the true latitude and longitude corresponding to the true current location information.

The false location information record is transmitted alternately with the true location information record. However, the server can determine whether each received location information record is true or false. For example, the resident program transmits the true location information record with a UNIX time which is an even number, and the false location information record with a UNIX time which is an odd number. Namely, the resident program transmits a location information record after incrementing its UNIX time by one second if necessary. In this case, the true location information record and the false location information record are alternately transmitted at intervals of five minutes.

The server receives and distinctively accumulates the true and false location information records in association with the user ID corresponding thereto. Each of the true location information record and the false location information record contain a time field and a latitude/longitude field for storing encrypted latitude/longitude data.

Since these records are arranged at intervals of five minutes, the time field can be dispensed with in a practical implementation. Specifically describing as illustrated in FIG. 22, after receiving the first location information record, the Unix time thereof is written into the first address (0th address) indexed in units of 64 bits. In this example shown in FIG. 22, a UNIX of 0x5274973a is written into the first address. Meanwhile, in FIG. 22, the latitude and longitude values are illustrated in plaintext for the sake of clarity in explanation. The data actually stored in the server of the identity provider is encrypted data which appears meaningless bit strings of random numbers.

The latitude and longitude values of the first location information record are written into the next address (1st address) as a true location information record. Of the 64-bit storage region corresponding to the N-th address (N>0), the upper 32-bit half is used to store a latitude value and the lower 32-bit half is used to store a longitude value. The latitude and longitude values received after 5(N+1)th minutes are written into the N-th address. If no location information record is received from the mobile communication device, 0 is stored in the address corresponding to the current time. The location information history thereby consists of true location information records stored in odd address and false location information records stored in even address.

Next, the identity confirmation method by the use of this server will be explained. First, the user accesses a log-in dialog of the service provider through the browser as shown in FIG. 12. The log-in dialog includes a form in which the user can enter a user ID. When the user presses a send button after entering the user ID, an authentication request is redirected to the identity provider. This authentication request is transmitted to the identity provider together with the user ID, the URL of this service provider and an authorization ID.

This authorization ID is issued by the service provider and associated with the user ID and the identity provider. Also, the authorization ID is effective only for a predetermined effective period, for example, twenty minutes. The user has to finish the log-in process within this effective period. The above steps are the same as those of the identity confirmation method according to the embodiment 1. Then, an authentication process is performed between the browser and the identity provider as follows.

First, the identity provider randomly extracts a true location information record from an odd address A of the location information history corresponding to the user ID. Also, the identity provider extracts four false location information records from the addresses A+1, A+3, A+5 and A+7 of this location information history. The extracted five location information records are shuffled at random in order that the true location information record cannot be determined from the position. These records are transmitted to the mobile communication device together with the Unix time of the true location information record which can be calculated from the address A. The identity provider cannot know the latitude and longitude of the true location information record which are encrypted. However, the identity provider saves the position of the true location information record in the transmitted five records which are shuffled.

The mobile communication device receives and decripts the five location information records. As illustrated in FIG. 22, the decryption method is the reverse of the encryption method as described above. Namely, the encryption key which is saved in the mobile communication device is concatenated with the Unix time which is received together with the five location information records, and processed by the hash function which is used when encrypting the location information records to generate the 64-bit encryption bit sequence. The latitude and longitude data of 64 bits as encrypted is exclusive ORed with the encryption bit sequence to generate the latitude and longitude data as plaintext.

Multiple-choice questions are generated on the basis of the decrypted latitude and longitude data in the same manner as in the embodiment 1. However, in this embodiment 6, the generation of the questions are performed by the resident program in the mobile communication device side. The user of the mobile communication device answers the questions as to which record is correct to the identity provider, and the mobile communication device transmits this answer to the identity provider. For example, if the user can correctly answer three or more out of the five questions, the user is authenticated in the same manner as the identity confirmation method according to the embodiment 1.

In the aforementioned identity confirmation method, four false location information records are selected after extracting the true location information record. Accordingly, when the resident program of the mobile communication device transmits a false location information record, the location (in the form of a latitude and a longitude) contained in the false location information record is selected at random to be substantially distant from the location of the previous true location information record. For example, the distance between the false location information record and the previous true location information record is substantially larger than the distance through which a person cannot move within 10 minutes. For this purpose, the previous true location information records (latitude and longitude values) have to be saved in the mobile communication device. Any of the four false location information records shall therefore not be a correct answer by chance.

On the other hand, the data stored in the server is a memorandum record of the action history of each user, and therefore might be a useful information source for some user. The server may provide a location information record which a user desired to obtain by designating the date and time thereof. The location information history can thereby be memorandum records for users. Besides memorandum records, there may be applications of the location information history from which a user can obtain own location information.

It is therefore possible to avoid personal information leakage risk by transmitting latitude and longitude information only after encryption and preserve user's privacy such as action histories. That is, the data stored in the server appears for persons other than that user only meaningless bit strings of random numbers from which no information can be obtained. Even if the encryption key is leaked to a third person, the third person can only decrypt questions transmitted from the server, but cannot know correct answers. Accordingly, fraudulent login is impossible.

As apparent from the above description, the third person has to clear two hurdles in order to the location information history as plaintext. First, the third person has to raid into the server in some way and get the database of the user. The encrypted latitude and longitude data can be obtained by this step. Next, the third person has to raid into the mobile communication device of the user, determine the location of the encryption key which is used by the resident program, succeed in accessing the location, and get the encryption key. After clearing the above two hurdles, the third person can the true location information records. Since it is hard to clear even either one of the two hurdles, it is almost impossible to clear both so that personal information is sufficiently protected.

Embodiment 7

In this embodiment, the current location information of a mobile communication device is periodically measured by the resident program installed in this mobile communication device in the same manner as described in the embodiment 1. However, in this embodiment, the location information as measured is stored in a database provided within the mobile communication device. The configuration of this database is the same as the history table as illustrated in FIG. 2. The current location information is accumulated in the same manner as in the embodiment 1 except that the history table is located in each mobile communication device and that the current location table is not used, and therefore no redundant description is repeated.

Namely, the resident program installed in the mobile communication device 3A of FIG. 1 collects the current location information thereof acquired by GPS or the like in a memory of the mobile communication device 3A. Also, the resident program installed in the mobile communication device 3B of FIG. 1 collects the current location information thereof acquired by GPS or the like in a memory of the mobile communication device 3B. The resident program of the embodiment 2 is provided with a visited location history matching function which is similar as that of the embodiment 1.

Figure 24:
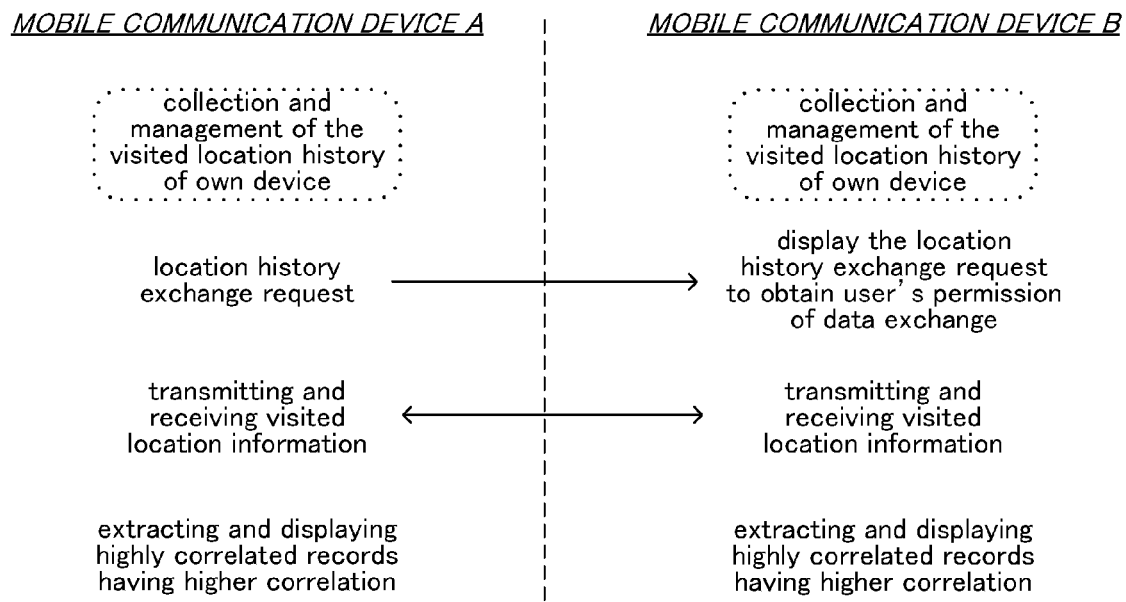
FIG. 24 is a view for explaining the information exchanging scheme of the user similarity provision method in accordance with an embodiment 7 of the present invention.

Next, the user similarity provision method of this embodiment will be explained in accordance with an actual usage scenario. FIG. 24 is a view for explaining the information exchanging scheme of the visited location history matching system. It is assumed that the user A with the mobile communication device 3A is attending a party and meeting the user B with the mobile communication device 3B for the first time. The user A proposes exchange of information for visited location history matching. The user B agrees and exchanges visited location history information with the user A through bluetooth, Wi-Fi Direct or the like communication device. Specifically speaking, first, the mobile communication device 3A transmits a location history exchange request to the mobile communication device 3B. The mobile communication device 3B displays this request with an OK button (not shown in the figure) which is pressed by the user B, followed by exchanging the location information histories between the user A and the user B.

Receiving the location information history of the mobile communication device 3B, the mobile communication device 3A compares these histories to extract the location records of the location information history of the mobile communication device 3B which correlate highly with the location records of the location information history of the mobile communication device 3A. The location records extracted are arranged in descending order of correlation with the visited location history of the mobile communication device 3A. This process is similar to that of the embodiment 1, and the list shown in FIG. 6 may be an example. The visited location history matching process is performed by the resident program of each mobile communication device. Incidentally, if the data amount of the location information history is too large, only the recent location records may be used.

Receiving the location information history of the mobile communication device 3A, the mobile communication device 3B performs the same process as described above so that the user B can view the similar information. With the common interests known from the correlated location records, the user A and the user B may have a nice chat. In other words, the location records extracted may be icebreakers of a real-life community.

As compared with the embodiment 1, this embodiment 2 is preferable in terms of security. Namely, in the case where the visited location histories of individuals are collected and controlled by the visited location history matching server, the reliability of the system shall be substantially damaged once information leak occurs. However, in the case of the embodiment 2, the risk is limited to the self-responsibility and the mutual trust between the user A and the user B.

Figure 25:
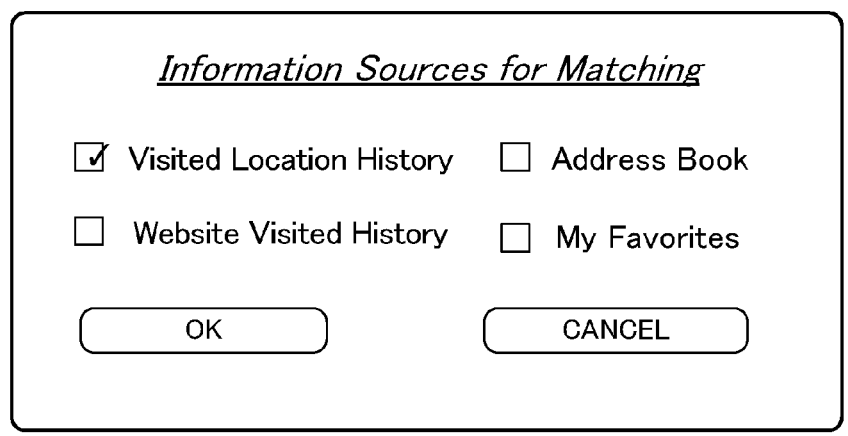
FIG. 25 is a view for showing a dialog through which a user can select additional information sources as options for extracting common interests shared between the users in accordance with the embodiment 7 of the present invention.

This user similarity provision method compares the visited location histories of two users provides the one user with the interests of the other user that are shared between these users. However, in addition to the location information histories, it is possible to use other information sources for extracting common interests shared between the users. Such information sources includes the visited history of website views, browser favorites (bookmarks) and the registered addresses of an address book. One or more information sources can be selected, for example, through a dialog shown in FIG. 25. For example, when the visited history of website views is selected, URLs commonly contained in the visited histories of website views of the two mobile communication devices are extracted. However, URLs of search engines are excluded from the search process. If common URLs are extracted, data is downloaded from these URLs followed by displaying the titles of pages as information about common interests. When browser favorites are selected, the browser favorites of the two mobile communication devices are matched in the same manner to display the page titles of the common URLs. When address book is selected, mutual acquaintances can be found by matching the address books of the two mobile communication devices. In this case, the mutual acquaintances are displayed on each mobile communication device in the names registered in this mobile communication device.

Furthermore, the aforementioned method for exchanging information is preferred from the view point of privacy concerns. For example, if one user likes fishing, his personal information about fishing is not disclosed to the other user unless this other user also likes fishing. Namely, only information about common interests is exchanged. Incidentally, it is not exceptional that there is no common data item in the visited history of website views, browser favorites and the registered addresses of an address book, and thereby one user can not know which sources the other user has selected.

Furthermore, in addition to the above information sources, any appropriate other user specific information may be used as information sources. For example, the data of a schedule may be used for this purpose which may include information about the interests of the user other than location information.

Embodiment 8

In this embodiment, the current location information of a mobile communication device is periodically measured by the resident program installed in this mobile communication device and stored in a database of this mobile communication device in the same manner as described in the embodiment 2. However, it is performed by a visited location history matching server to compare and match the location information histories and extract correlated location records. This visited location history matching server does not store location information histories but only matches the location information histories transmitted from mobile communication devices.

Figure 26:
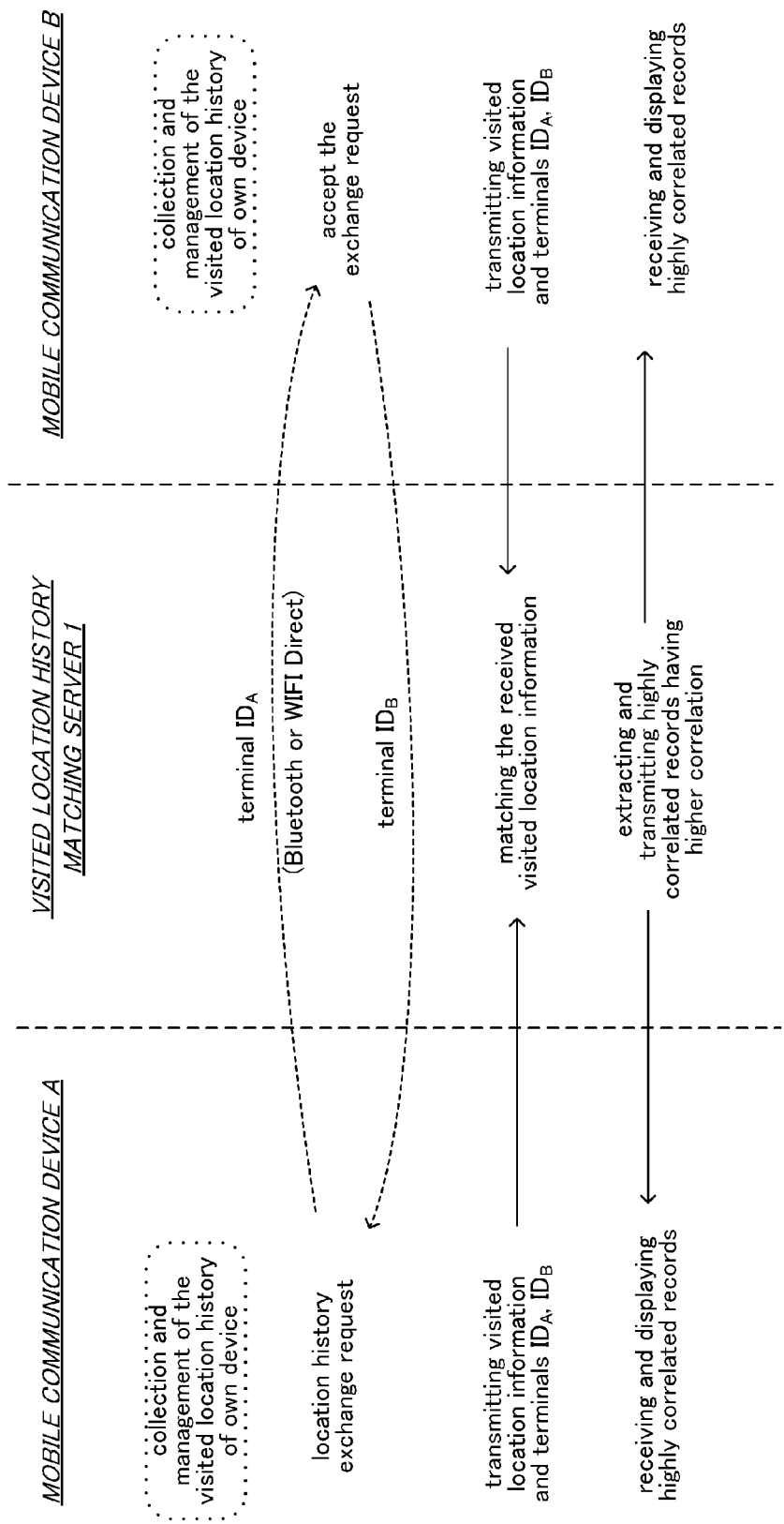
FIG. 26 is a view for explaining the information exchanging scheme of the user similarity provision method in accordance an the embodiment 8 of the present invention.

The visited location history matching system of this embodiment will be explained as follows in accordance with an actual usage scenario. FIG. 26 is a view for explaining the information exchanging scheme of the visited location history matching system. It is assumed again that the user A with the mobile communication device 3A is attending a party and meeting the user B with the mobile communication device 3B for the first time. The user A proposes exchange of information for visited location history matching. The user B agrees and receives a history exchange request from the user A through bluetooth, Wi-Fi Direct or the like communication device. The mobile communication device 3A and the mobile communication device 3B then exchange the terminal IDs thereof.

Next, the mobile communication device 3A and the mobile communication device 3B transmit the location information histories stored therein to the visited location history matching server respectively together with their terminal IDs. Receiving the histories and the terminal IDs, the visited location history matching server compares the histories and extract correlated location records. The location records extracted are arranged in descending order of correlation and displayed on the mobile communication device 3A and the mobile communication device 3B respectively. This process is performed in the same manner as that of the embodiment 1, and the list shown in FIG. 6 may be an example.

From the view point of users, the functionality of the embodiment 3 is substantially the same as that of the embodiment 2. However, the location information history is not transmitted to the other mobile communication device but transmitted only to the visited location history matching server. Only correlated location records are exchanged between the pair of mobile communication devices. The visited location history matching server deletes the location information histories after matching. Even if they meets for the first time, this system can be easily utilized without being concerned about security. Also in this case, if the data amount of the location information history is too large, only the recent location records may be used.

Embodiment 9

In this embodiment, the location information histories stored in the database of the embodiment 1 is used for exchange of information among users. For example, it is assumed that a user wants to know the end time of the jazz festival held on Aug. 28, 2011. In that case, a user search dialog of the resident program can be used for this purpose as illustrated in FIG. 27. The user search dialog may be opened, for example, by clicking a User Search button shown in FIG. 5.

The user can designate a place, a date, a time and a staying period as search terms in the user search dialog. For example, when the user enters "The Honmoku Local Park in Yokohama", "2011/08/28", "12:00" and "2:00" into the user search dialog followed by clicking a Search button, user search results are displayed, for example, as illustrated in FIG. 28. The search results are preferentially displayed from the location record closely related to the input search terms and having a longer staying period.

Figure 29:
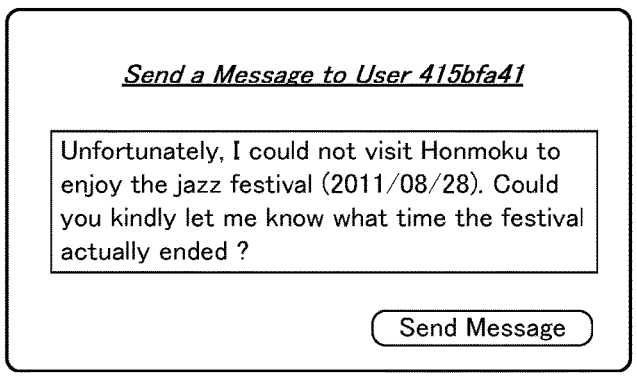
FIG. 29 is a view for showing a message edit screen for sending a message to another mobile communication device in accordance with the embodiment 9 of the present invention.
Figure 30:
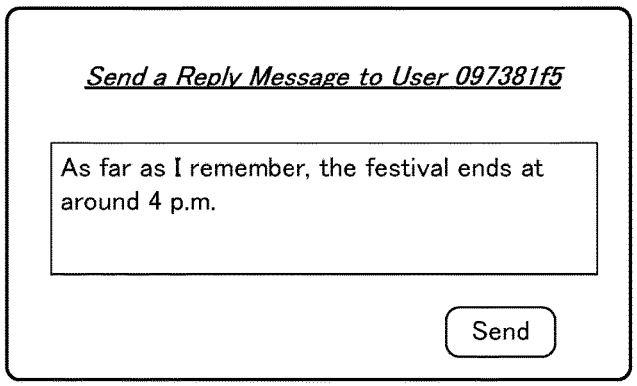
FIG. 30 is a view for showing a message edit screen for sending a reply message in accordance with the embodiment 9 of the present invention.

If a terminal ID "415bfa41" is clicked, a message edit screen is opened as illustrated in FIG. 29. After inputting a message to the message edit screen, the user can send the message to the mobile communication device of the terminal ID "415bfa41" by clicking the "Send Message" button. In response to this, a reply message may be returned as illustrated in FIG. 30. It is therefore possible to provide a new way for finding information associated with a particular place and a particular time.

Figure 31:
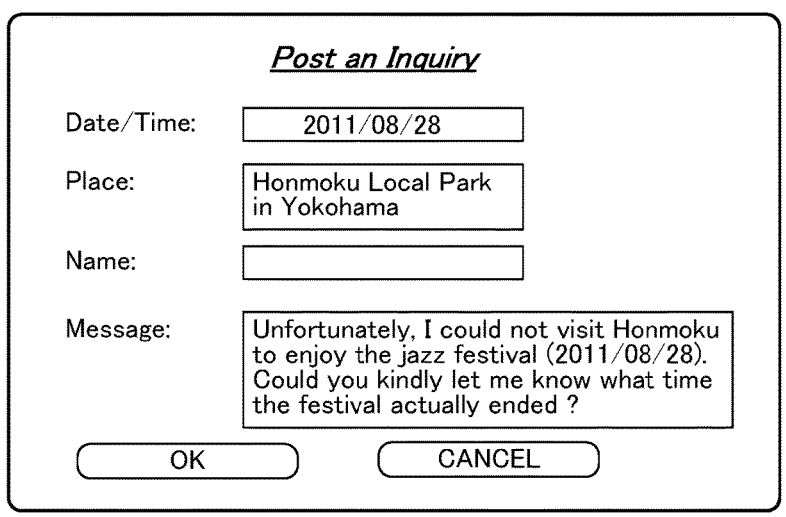
FIG. 31 is a view for showing a message edit screen for posting an inquiry message to a BBS in accordance with the embodiment 9 of the present invention.

The information exchange in the above example is closed in the exchanging users in the same manner as usual email exchange. The information exchange can be opened by the use of a BBS (Bulletin Board System) to more effectively utilize information accessible to the public. This BBS has the following functions in addition to the basic functions of an usual BBS. When posting a message, a user has to select either an inquiry message or a simple message. If an inquiry message is selected, a date and a place have to be designated, and these date and place are set as the name of a thread to be started from this message. FIG. 31 shows an example of an inquiry message edit screen. In this case, the name of a thread is "2011/08/28: Honmoku Local Park in Yokohama".

When an inquiry message is posted, the BBS searches the location information history database for location records corresponding to the date and place of the inquiry message to identify the user(s) corresponding to the location records. When the mobile communication device of the identified user(s) accesses the server for transmitting location information by a resident program, the resident program is notified by the server that the user is identified followed by displaying the thread of the BBS corresponding to the inquiry message as illustrated in FIG. 32.

The screen of the BBS includes a "POST" button which can be pressed to open a reply message edit screen as illustrated in FIG. 33. The identified user can edit and send a reply message to answer the question. On the other hand, the BBS includes a search link which can be clicked to open a search screen as illustrated in FIG. 34. From this search screen, anyone can find information associated with a particular place and a particular time. Also, in advance of posting an inquiry message, a user is requested to search for a similar thread through this search screen.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

For example, if a high accuracy indoor positioning system is available such that it can be identified which floor the user is staying, the history database may include such detailed information in the history table. A location record includes this detailed information makes it possible, for example, to identify which office the user has stayed in a bank building.

Furthermore, in the case where the mobile communication device is equipped with an altimeter, the information about which floor the user is staying can be obtained on the basis of the detected altitude and sent to the visited location history matching server as the above detailed information.

Also, as used in this specification, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

What is claimed is:

1. An identity confirmation method comprising:
a step of receiving current location information from a mobile communication device of a user;
a step of storing and accumulating, as a location information history, the current location information of the mobile communication device in association with a time when the mobile communication device is located in a location indicated by the current location information;
a step of receiving an authentication request of said user through a network;
a step of referring to the location information history and generating a question relating to the location information history;
a step of presenting the question to the user, wherein the question is displayed on a screen of the mobile communication device together with an interface through which the user inputs an answer to the question;
a step of receiving an answer to the question from the user through the interface;
a step of comparing and matching the answer with the location information history; and
a step of determining the identity of the user if the answer coincides with the location information history,
wherein the question relating to the location information history is a question which asks the user to specify a plurality of locations where the user successively visited in the past, and the order of visiting the plurality of locations,
wherein when the question is presented, a map is displayed to specify the plurality of locations in the visiting order as an answer to the question, and
wherein the user inputs the answer by a method comprising:
a first step of sliding a finger on the screen in the map from a first location where the user visited to a second location where the user visited after the first location; and
a second step of sliding the finger on the screen in the map from the second location to a third location where the user visited after the second location,
wherein the first and second steps are successively performed without lifting the finger from the screen.

2. The identity confirmation method of claim 1 wherein when the question is presented, the map is expanded to display a detailed map is designated by the user.

3. The identity confirmation method of claim 1 wherein the relation between a speed of the sliding finger from the first location and the second location and a speed of the sliding finger from the second location and the third location corresponds to a relation between a speed of the user moving the first location and the second location and a speed of the user from the second location and the third location.

4. The identity confirmation method of claim 1 wherein the user inputs that the user has stayed for a longer period in a particular location than in an alternative location by pressing the particular location on the map under a stronger pressure than the user applied to indicate the alternative location.

* * * * *